Jan. 3, 1967   G. FUENTES, JR   3,296,347
PROCESS OF MAKING A PROSTHETIC POULTRY SPUR
Original Filed May 4, 1964   3 Sheets-Sheet 1
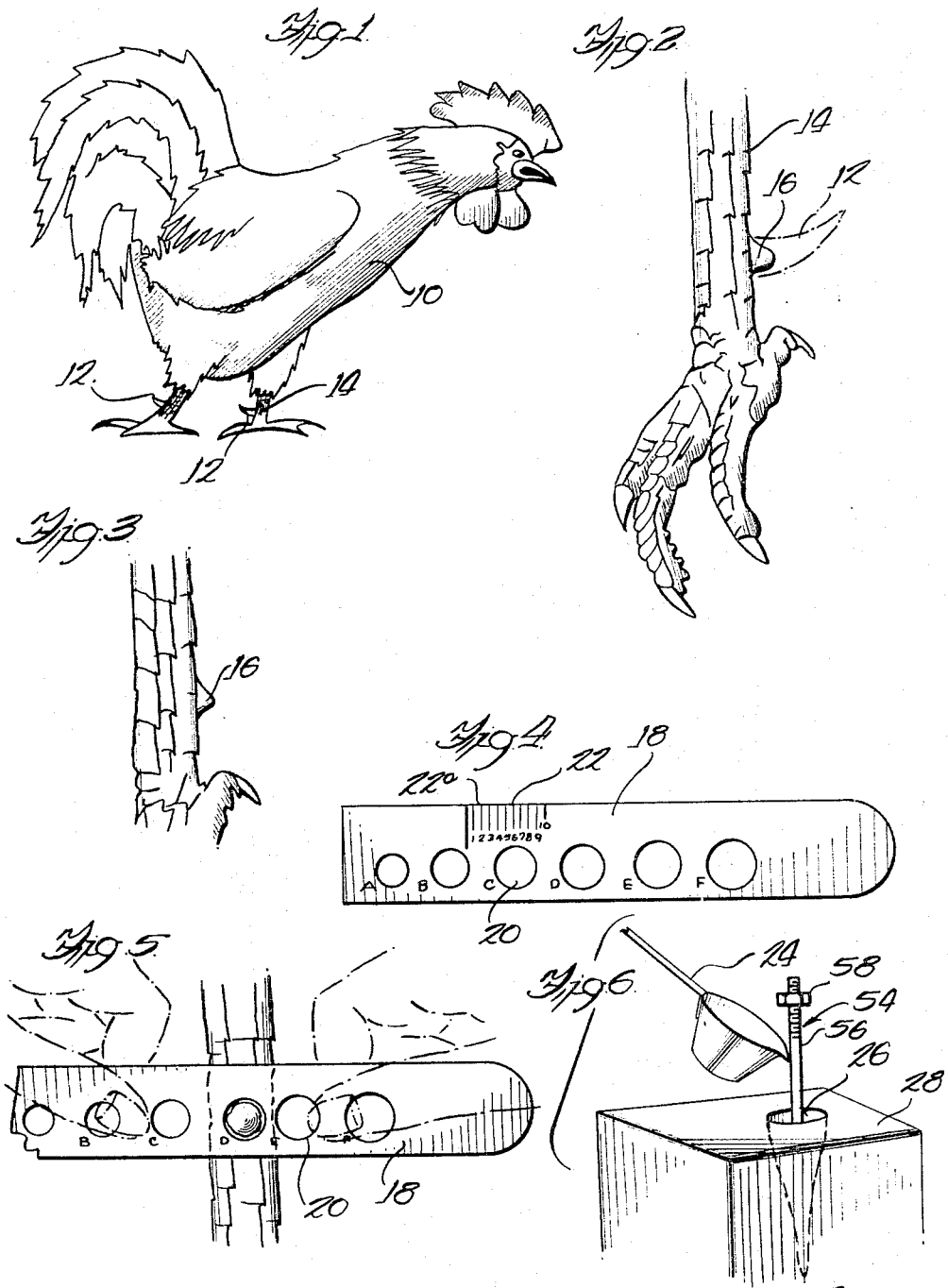

Jan. 3, 1967   G. FUENTES, JR   3,296,347
PROCESS OF MAKING A PROSTHETIC POULTRY SPUR
Original Filed May 4, 1964   3 Sheets-Sheet 2
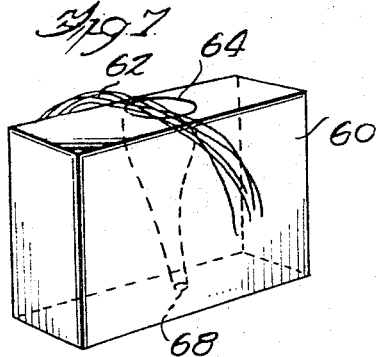
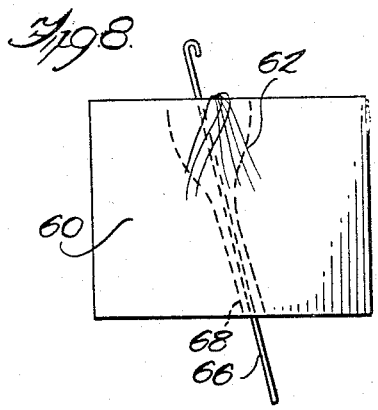
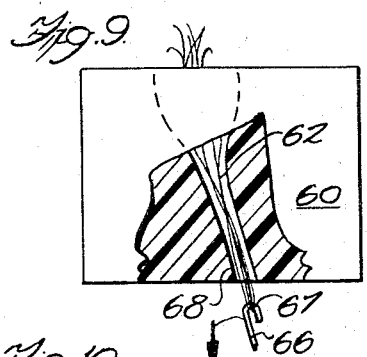
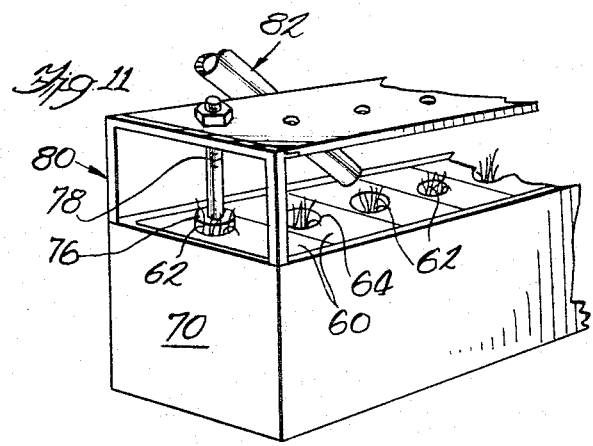
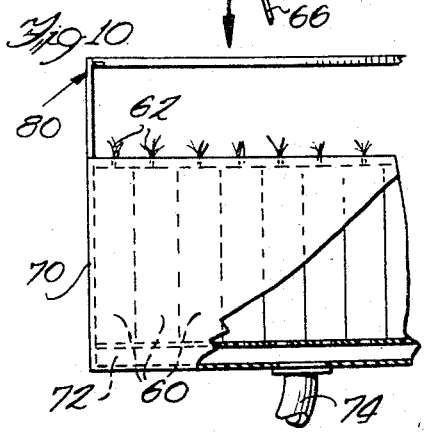
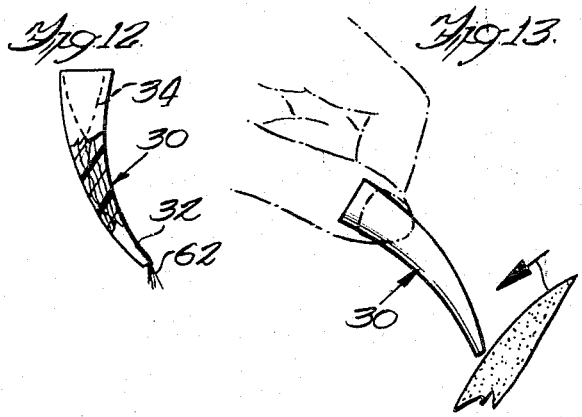

Jan. 3, 1967  G. FUENTES, JR  3,296,347
PROCESS OF MAKING A PROSTHETIC POULTRY SPUR
Original Filed May 4, 1964  3 Sheets-Sheet 3
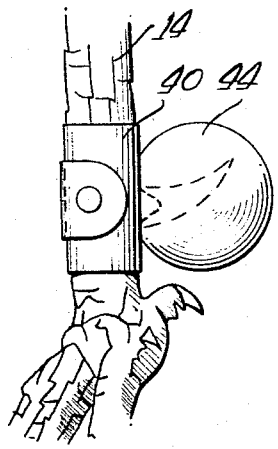
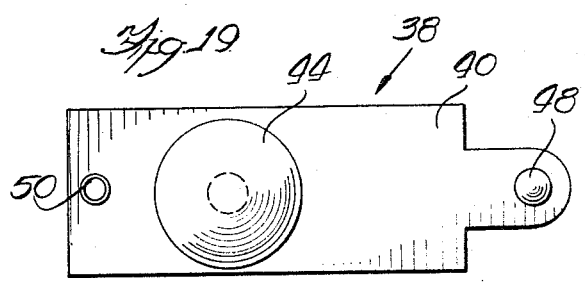
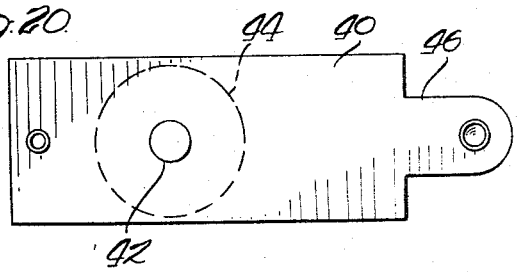
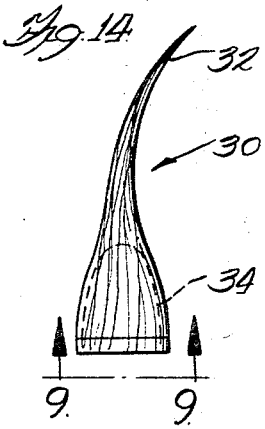
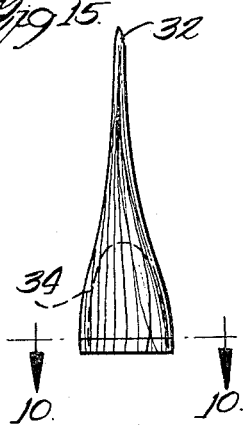
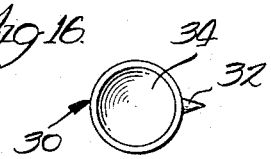
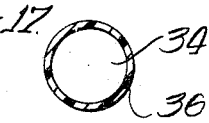

United States Patent Office 3,296,347
Patented Jan. 3, 1967

3,296,347
PROCESS OF MAKING A PROSTHETIC
POULTRY SPUR
Gabriel Fuentes, Jr., P.O. Box 867,
Bayamon, Puerto Rico 00902
Original application May 4, 1964, Ser. No. 364,601, now Patent No. 3,224,412, dated Dec. 21, 1965. Divided and this application July 19, 1965, Ser. No. 484,149
5 Claims. (Cl. 264—162)

This application is a divisional application of application Serial No. 364,601, now U.S. Patent No. 3,224,412, filed May 4, 1964.

This invention relates to the protection and/or arming of poultry and involves the manufacture of prosthetic devices therefor, the fitting and installation of such devices, and means to temporarily neutralize said devices under certain circumstances. More particularly, this invention relates to the manufacture of novel prosthetic spurs for poultry, especially chickens, unique means for easily measuring the fowl whereby it can be fitted with the proper sized prosthetic spurs, to means for securing each spur to the fowl and to means for temporarily shielding these spurs to permit practice bouts or to neutralize the aggressive tendencies of such fowl during periods of socialization.

Poultry, especially chickens, and particularly roosters, normally grow a horny, spine-like growth on the back side of the leg which is called a spur. The chicken uses the spur for purposes of defense and offense. For example, in the barnyard, the chicken must defend himself against other aggressive chickens. He must also assert himself to obtain a certain stature within the social society of his fellow chickens. The reader is probably aware of the "pecking-order" within the poultry society. To accomplish such stature, the chicken uses both his beak and his spurs on the back side of his legs. With respect to the latter, he flies or swoops slightly up off the ground and beats or flails his legs at his opponent with the spurs pointed inwardly so as to drive the opponent off or subdue him. This is a natural defensive and offensive trait in all poultry.

This natural tendency has been commercialized by human beings for many years. It is more commonly known as "cock-fighting." While many states have outlawed the sport, there are still some states, territories and possessions of the United States and foreign countries where such sport is extremely popular and is a major source of revenue. The invention here has great utility for such sport and, indeed, minimizes the occasional cruel and inhuman result of broken natural spurs during a contest.

In raising prize cocks for agricultural show purposes, there is occasional need to provide the cock with a defensive means so that he can defend himself against other competing cocks who may suddenly acquire an aggressive mood. Furthermore, there are instances in the barnyard where several cocks are needed for stud purposes. It becomes important then to arm them or disarm them completely so that there will be no domineering cock.

Heretofore, replacement prosthetic spurs were derived from natural spurs taken from "supply" roosters. Naturally, the supply rooster had to be destroyed so that the spur could be cut from his leg. This was obviously undesirable unless, of course, there was a supply available from a local poultry slaughtering house.

In such prior art technique, the individual spur, after being cut from the rooster, was cleaned, and the soft tissue at the base of the spur was removed to leave a hollow space. This hollow space was fitted upon the stub or stump of the rooster being fitted with the substitute spur. Such a naturally derived spur was only brought to the desired shape by a long drawn-out procedure which required considerable hand skill and time. This added a great deal to its cost. Furthermore, since the spur was naturally derived, it varied widely in quality and in size. Thus, the rooster fancier not only had to hunt around for a suitable supply, but also had to match the spur obtained to fit it to his rooster. Frequently, he had to "make-do" by resorting to defective or poorly fitted spurs with consequent imminent danger to his prize rooster.

An object of this invention is to provide a more uniform synthetic spur for poultry.

Another object is to provide novel economic methods for the manufacture of such a prosthetic spur.

Other objects of the invention will in part be obvious and will in part appear hereinafter.

The invention accordingly comprises the several steps and the relation of one or more of such steps with respect to each of the others, the apparatus embodying features of construction, combination and arrangement of parts which are adapted to effect such steps, and the product which possesses the characteristics, properties and relation of elements, all as exemplified in the detailed disclosure hereinafter set forth, and the scope of the invention will be indicated in the claims.

The objects stated above may be achieved by manufacturing the prosthetic spur using a fiber reinforced plastic as the raw material. The plastic utilized is a synthetic resin preferably an epoxy condensation polymer and the fiber reinforcement therein is preferably glass fiber which is positioned lengthwise within the spur, as will be described in greater detail. The resin may be combined with other plastics, and with modifiers, plasticizers and reinforcing substances. Stabilizers, colorants, dyes, pearlescent agents and the like may also be included.

The method preferably utilized to manufacture the spur, in its most basic embodiment, is illustrated stepwise in FIGURES 7 to 13 of the drawing and involves the positioning of reinforcing strand material such as glass fiber lengthwise within a mold cavity. Then after a shoe form has been positioned within the mold cavity, a resin bonding material is poured into the mold. The technique of pour is such that air bubbles, voids and complete wetting of the surface of the strand material is accomplished. The molded spur body with the shoe cavity therein is then cured, while in the mold, then removed, polished, if desired and the tip ground to a sharp point.

Such a prosthetic spur formed in accordance with the method of this invention, has physical properties, such as hardness, resilience, flexibility and color which can be precisely controlled. Its shape and design can be easily duplicated. A uniformly superior product can be produced free of flaws. A spur so made is especially superior to a naturally derived spur which usually has high variability in physical properties, and contains flaws of one kind or another.

The prosthetic spur of this invention is also superior in another respect. In naturally derived spurs, the collar or shoe, that part of the prosthetic spur which covers the stump of the old spur on the recipient rooster is usually very thin and weak, and generally requires reinforcement to properly fit it to the fowl. Such reinforcement is accomplished by winding string or adhesive tape over the shoe after it is fitted onto the leg of the fowl. In contrast, in the prosthetic spur of this invention, the shoe or collar may be formed with a heavy uniform cross-section. Additional reinforcing material may also be incorporated in the shoe portion of the spur to provide additional strength whereby the need for auxiliary reinforcement, such as said string or tape, may be avoided. It should be noted that the reinforcing agent may also be located in other localized areas of the spur such as in the collar or at the point to provide additional strength.

A device (see FIG. 4) which facilitates the measurement of the stump on the fowl's leg to correctly fit it with the correct size prosthetic spur has also been devised. It also uniquely permits easy selection of a spur length most suitable for the chicken by simple reference to a number identifying means.

Also, a novel shield or glove 38 (see FIGS. 18 to 20) has been devised for the prosthetic spur so that the owner may temporarily and easily neutralize any sudden aggressive tendency of the fowl during practice cock-fights or during a poultry show or during barnyard sojourn.

For a fuller understanding of the nature and objects of this invention, reference should be had to the following detailed description taken in connection with the accompanying drawings in which:

FIG. 1 illustrates a rooster which has been fitted with the prosthetic spurs of this invention.

FIG. 2 is a detailed enlarged view of one leg of the rooster illustrating how the prosthetic spur will be fitted onto the stump.

FIG. 3 is an enlarged view of the rooster's leg showing the stump as it occurs naturally.

FIG. 4 is a planar view of a novel device for measuring the size of the stump.

FIG. 5 illustrates use of the measure for determining the size of the stump.

FIG. 6 illustrates a casting method for forming a mold model which is used for casting a mold for the prosthetic spur of this invention.

FIG. 7 is a perspective view illustrating the initial step involved in incorporating reinforcing strands into a spur.

FIG. 8 is a side view illustrating how the strands are pulled into the mold.

FIG. 9 is a side view partly in section showing the strands longitudinally positioned within the mold.

FIG. 10 is a side cross-sectional view illustrating how a series of molds are arranged prior to the pour of synthetic resin into the strand containing mold cavities.

FIG. 11 is a perspective view illustrating the pour.

FIG. 12 is a side view of the rough molded spur.

FIG. 13 illustrates finishing the spur with a point.

FIG. 14 is a side view of the finished spur.

FIG. 15 is a front view of the spur.

FIG. 16 is a bottom view of the spur.

FIG. 17 is a cross-sectional view of the spur taken along line 10—10 of FIG. 8.

FIG. 18 is a pictorial view of a shield or protective glove for neutralizing the prosthetic spur.

FIG. 19 is a top view of the shield or glove when it is laid flat.

FIG. 20 is a bottom view of the shield.

Similar reference characters refer to similar parts throughout the several views of the drawings.

Referring to FIG. 1, there is shown a rooster 10 fitted with the prosthetic spurs 12 of this invention on the rear of each leg 14. Prior to such fitting of the prosthetic spur 12 to leg 14, the leg appears as indicated in FIG. 3 and usually has a stump 16. This stump varies from rooster to rooster and depends upon the metabolism of the rooster, the use to which the rooster has put his natural growing spur, and the ordinary wear and tear which occurs in the everyday social life of the rooster. It should be evident that if it is defective or has been overly worn or damaged, the rooster is at a disadvantage with respect to his fellow roosters or chickens. Accordingly, he must be fitted with an appropriate substitute and this is accomplished by applying a prosthetic spur of this invention to each of the stumps.

*Fitting of spur.*—In order to determine the size of the existing stump 16, use is made of a novel measure 18 illustrated in FIGS. 4 and 5. As seen, it comprises a flat elongated member, preferably disposable after each use, having various sized orifices or holes 20 therein to measure the outer diameter of the stump 16 when it is positioned over the stump such as seen in FIG. 5 with the stump extending into one of the holes. When the right sized hole is found, its size is read. This size can be indicated by reference to particular letters, such as A, B, C, D, E and F. These designations can be used to identify stock prosthetic spurs kept on hand by the rooster fancier.

Measure 18 also has a scale 22 thereon for the purpose of easily determining the length of the prosthetic spur desired. Each individual line 22a has a designation, such as 1, 2, 3, 4, etc. which can be used to identify readily the size needed. Thus, by referring to the orifice size and the length size, the rooster fancier can immediately order or select the spur 12 of the desired stump and length dimension.

*Manufacture of spur.*—FIGURES 6 to 17 illustrate in detail the prosthetic spur and its manufacture.

As seen in FIG. 6 a casting method is first employed to manufacture a mold model 52, which is subsequently used to form a production mold for the spur. As shown, liquid resin, capable of hardening into model 52, is poured from ladle 24 into cavity 26 contained within mold block 28. The cavity has the shape and dimension of the cock spur desired. A handle 54 comprising a threaded rod 56 with nut 58 thereon extends into the cavity. This handle facilitates handling of the model 52 in subsequent steps in the manufacture of the spur.

The liquid resin used to make the mold model 52 may comprise methyl methacrylate, epoxy, diallyl isophthalate, unsaturated polyesteracrylate, unsaturated polyester-diallyl phthalate, phenol-formaldehyde and the like. Modifiers may be added to the liquid mixture prior to use.

After pouring, the mixture is cured until hard. The resultant hardened mold model 52 is then removed from cavity 26 by simply pulling upwardly on handle 54.

A production mold block 60 (see FIG. 7) is then formed utilizing model 52. Silicone rubber, such as Silastic manufactured by Dow-Corning of Midland, Michigan, admixed with a hardening catalyst is poured around the mold model 52 as the latter hangs suspended, via its handle 54, in a rectangular container. The poured rubber is allowed to stand, at room temperature, around the model until it assumes a solid rubbery block configuration. Then the mold model is withdrawn from the mold block 60.

To manufacture the cock spur, strands of reinforcing material 62, such as fiber glass are draped over the upper opening of cavity 64, of the block 60 as illustrated in FIG. 7. The strands are then pulled through the cavity with hook pull 66. After removal of pull 66, the strands are cut above bend 67 to obtain a longitudinal array of strands within the cavity.

After the mold block 60 is filled with strands, it is positioned in mold fixture 70 (see FIG. 10). The fixture has a common manifold 72 with vacuum line 74 connected thereto. The lower opening 68 in each block communicates with the manifold.

After a plurality of mold blocks have been positioned within fixture 70, to seal the manifold, individual shoe forms 76 are suspended within the upper portion of cavity 64, via support bar 78 and rack 80 of the fixture as illustrated in FIG. 11. Each form is concentrically arranged within the cavity. The shoe forms form the shoe 34 of the finished spur (see FIG. 12).

Following this, the reinforcing strands are evenly arranged around each shoe form. Liquid synthetic resin composition, such as an epoxy resin with curing catalyst therein, is then poured into cavity 64 via pour spout 82. During the pour, a vacuum is drawn on the mold cavity 64 via manifold 72. Complete filling of the mold cavity as well as thorough wetting of each strand with resin is thereby insured. Voids, air spaces, bubbles, or the like within the finished spur is therefore avoided which are normally sources of weakness in spurs.

After the pour, the fixture, is subjected, for approximately one-half to three-quarters of an hour to a temperature of 100° to 120° C. This cures the resin. After cooling, the rough spur formed (illustrated in FIG. 12)

is removed. It is then subjected to a post cure for approximately 16 to 30 hours at 100° to 120° C. Each spur is then trimmed and polished as illustrated in FIG. 13.

Reference is now made to specific examples which illustrate the manufacture of a prosthetic spur; Example I being the preferred way because it results in a stronger spur:

Example I

A number of molds are made by casting silicone rubber (100 parts Silastic RTV admixed with 4 parts suitable hardening catalyst such as dibutyl tin dilaurate) around several mold models. The silicone rubber mixture is allowed to harden (about 24 hours). Then after removal of the mold models, each mold is checked to see that it is clean and that its lower open end is free of obstruction.

Strands of fiber glass roving (30 to 60 ends) are then longitudinally positioned within the mold cavity in accordance with the technique discussed above. The bend and excess of fiber glass is cut off with a scissor.

Each mold is then placed within mold fixture 70 (see FIG. 11). A shoe form 76 is then positioned within the upper portion of each cavity. The glass fiber is spread around the shoe form. Then the vacuum in manifold 72 is turned on.

Epoxy resin with hardener mixed therein, such as 50 parts Epon 828 resin admixed with 3 parts diethylene triamine, is then poured into each mold cavity. The mold fixture is then positioned within a heated atmosphere of 100° C. for ½ hour to harden the epoxy resin composition. The rough finished spur (see FIG. 12) is then removed from the mold cavity and cured for 16 hours at 100° C. It is then trimmed and polished.

Example II

Into a mold similar to mold 60 is poured a mixture of 80 parts methyl methacrylate monomer, 15 parts butyl methacrylate monomer, three parts allyl methacrylate monomer, two parts diethylene glycol dimethacrylate monomer, one part tertiary butyl peroxide, one part benzoyl peroxide and one part methyl ethyl ketone peroxide. The mold is kept at 35° C. for 48 hours, 45° C. for 12 hours, and 60° C. for 24 hours. The spur is removed from the mold, and cured further for 12 hours at 90° C. It is then allowed to cool to room temperature very slowly. The rough prosthetic spur is then polished on a buffing wheel.

Example III

Another mold similar to 60, may be first treated with a strong soap solution as a parting agent, and then allowed to air dry. Into the treated mold is poured a mixture of a polyester made of fumaric acid, isophthalic acid and diethylene glycol, 75 parts; diallyl isophthalate, 25 parts, benzoyl peroxide, 1 part, tertiary butyl perbenzoate, 1 part, and cobalt octoate catalyst corresponding to .01% of cobalt. The mold is kept at 35° C. for 24 hours, then slowly heated to 90° C. over a period of 6 hours, held at 90° C. for 6 hours, and then slowly cooled to room temperature. After the prosthetic spur is removed from the mold, it is polished on a buffing wheel.

Example IV

In a separate vessel, there is mixed 100 parts of an epoxy resin made from bis-phenol A and epichlorhydrin having an epoxy equivalent of about one gram mole of epoxy oxygen per 200 grams, twenty-five parts of a polyamide resin made from dimerized oleic acid and diethylene triamine, and nine parts of meta phenylene diamine. The mixture is heated in an oven at 75° C. for six hours, then at 100° C. for 3 hours, 120° C. for 6 hours, and then cooled slowly to room temperature. The solid is removed from the beaker and cured at 150° C. for 12 hours. The solid chunk is then sawed into smaller pieces from which are machined excellent prosthetic spurs. The plastic is tough and hard but not brittle, and is easily machined into the desired shape.

*The spur itself.*—FIGS. 14 and 15 illustrate side and front views, respectively, of the finished spur. As seen, it is a horn-like device 30 with a point 32 at one end and an enlarged hollow socket or shoe 34 at the other end. Strands of reinforcing material extend longitudinally through the body including the point and the shoe portion of the spur. Thus strength is imparted throughout the spur. This is evidenced by the fact that it is substantially impossible for a rooster to break or snap the spur in half. In use, no breakage has thus far been evidenced. This is in contrast to the naturally derived spurs where frequent point or spur shoe shattering occurs to the extreme disadvantage of the chicken using that spur.

The particular dimension of the socket or shoe 34 is governed by the existing stump on the rooster or fowl upon which it is to be fitted. The socket or shoe cavity is cone-shaped and of proper depth to receive the full height of the existing stump with adhesive or other adhering means thereon. As particularly seen in FIG. 16, the walls 36 of the shoe are uniform so that it has uniform strength and will be uniformly held to the stump by inserting a molten wax similar to that now being used for applying natural cock spurs into the hollow socket and immediately applying the socket to the stump 16. Alternatively, the wax may be applied to the stump directly, and the prosthetic spur immediately fitted over the wax coated stump.

As to the different sizes that can be made, they will generally have the following dimensions:

(A) The diameter will vary from $^{18}\!/_{64}$ inch to $^{23}\!/_{64}$ inch with increments between each size of $\frac{1}{64}$ inch. The $^{18}\!/_{64}$ inch size is that illustrated as A in the measuring device, while the $^{23}\!/_{64}$ inch is that indicated as size F.

(B) As to length, the size will usually be $^{19}\!/_{64}$ inch to $^{26}\!/_{16}$ inch, and advancing in increments of $\frac{1}{16}$ inch. This is indicated by reference to the marking 22 on the stick 18 of the measuring device described above.

These sizes are typical of those useful for refitting the fowl.

It is occasionally found advantageous to have a greater density of fibers along the inner curve of the spur since this area is most subject to stress during use. This is accomplished by adding fiber, prior to the pour, to this area. Examples of fibers which are found useful in this regard are nylon, terephthalic polyester, metal, glass, rayon of high tensile strength, cellulose acetate of high acetyl value, polyvinyl alcohol and polyacrylonitrile.

As to variations in the resin employed for the spur, epoxy resin is preferred. However, resins such as the polyesters, the polyalkyds, the polyacrylates, the polyamides, and other resins compatible with the reinforcing fiber utilized or mixtures thereof may be used.

Certain of the above resins require hardeners, catalysts etc. to cure them. For example, with epoxy resin, hardeners such as dimethylaminoethanol, diethylaminoethanol, diethylaminopropylamine and the like are used. The concentration usually varies from 20 to 70%, and 50% is preferred.

*Use of spurs.*—From a stock of different sized spurs made as described in detail above or in accordance with other methods indicated, a pair of spurs is selected for each rooster being fitted. The stump of each leg of the rooster is measured by the use of measure 18.

After proper selection of the right sized spur, a wax, customarily used, which melts when heated with a match, is placed in the fluid condition onto the stump. Then, while still in the plastic state, the prosthetic spur is placed in position over the stump, with slight pressure, the displace excess wax out through the space between the stump and the socket wall of the spur. Excess wax is wiped off with a rag. The wax then hardens, within a few minutes. The rooster is now prepared to use the spur as he pleases.

In actual use, all of the spurs were found to be uniformly strong throughout the entire socket and point portion of the spur. There was no breakage of either end to the detriment of the fitted rooster. Compared with the natural type spur, each spur had longer life, was more reliable and did not fracture. There was also no need to select individual spurs by reference to the raw material since the method of manufacture caused similar physical and chemical characteristics in all the stock spurs.

*Spur neutralization.*—Occasionally, a situation arises which necessitates neutralizing the spur fitted on the rooster. To accomplish this end, a protective glove 38 is fitted over the spur. FIGS. 18 to 20 illustrate such a protective glove. It consists of a flat elongated web or strap 40 of leather, cloth, plastic sheet, and the like. It has an orifice 42 therein which is covered by a ball 44. The ball may be hollow or may be made of sponge, either actual or synthetic, so that the prosthetic spur can be pushed into the ball 44. The tail 46 of the strap 40 has one portion 48 of a fastener, such as a snap, or a sliding buckle fastener secured thereto. The other portion 50 of the fastener is affixed to the other tail so that when strap 40 is wrapped around leg 14 of the fowl (FIG. 18), the glove can be immediately secured thereto by merely securing the two portions 48 and 50 of the fastener together.

In use, the glove is very effective. It is easily and quickly attached. And its structure insures that ball 44 will not fall off the spur. Even sharp blows are not effective to knock it off. Thus, the rooster can safely practice or be given free reign without fear of his attacking other more docile species of the flock.

It will thus be seen that the objects set forth above, among those made apparent from the preceding description, are efficiently attained, and since certain changes may be made in carrying out the above process, in the described product, and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A method for manufacturing a prosthetic spur for poultry comprising the steps of forming a mold cavity of the spur shape desired, drawing reinforcing strand material into said mold cavity to longitudinally position said reinforcing strand material therein by means extended into and through said mold cavity from its top to its bottom, then inserting a hardenable synthetic plastic into said mold, curing said plastic to form a spur blank, removing said blank and sharpening the point of said blank.

2. A method for manufacturing a prosthetic spur for poultry comprising the steps of forming a mold cavity of the spur shape desired, draping reinforcing strand material over the upper opening of said mold cavity, pulling said reinforcing strand material through said cavity, longitudinally positioning said reinforcing strand material therein, then inserting a hardenable epoxy resin composition in said mold, curing said epoxy resin to form a spur blank, removing said blank, subjecting said blank to curing and sharpening the point of said blank.

3. A method for manufacturing a prosthetic spur for poultry comprising the steps of forming a mold cavity of the spur shape desired, draping glass fibers over the upper opening of said mold cavity, pulling said glass fibers through said cavity to longitudinally position said glass fibers therein, then inserting a spur shoe form into the upper end of said mold cavity, then inserting a hardenable epoxy resin composition into said mold, curing said epoxy resin plastic to form a spur blank, removing said blank, subjecting said blank to curing and sharpening the point of said blank.

4. A method for manufacturing a prosthetic spur for poultry comprising the steps of forming a mold cavity of the spur shape desired, drawing glass fibers into said mold cavity to longitudinally position said glass fibers therein by means extended into and through said mold cavity from its top to its bottom, then inserting a spur shoe form into the upper end of said mold cavity, then inserting a hardenable epoxy resin composition while drawing a vacuum from the lower end of said mold cavity to prevent the formation of voids into said mold, curing said epoxy resin plastic to form a spur blank, removing said blank, subjecting said blank to curing and sharpening the point of said blank.

5. The method of claim 3 wherein said epoxy resin composition comprises an epoxy resin and dimethyl amino ethanol as a hardener therefor.

References Cited by the Examiner

UNITED STATES PATENTS

| | | | |
|---|---|---|---|
| 2,308,971 | 1/1943 | Carter. | |
| 2,398,326 | 4/1946 | Reeves | 264—162 X |
| 2,945,262 | 7/1960 | Petty | 264—257 |

OTHER REFERENCES

Skeist, I.: Epoxy Resins, Reinhold Publishing Corp., New York, 1958, pp. 21, 23, 232–8.

ALEXANDER H. BRODMERKEL, *Primary Examiner.*

ROBERT F. WHITE, *Examiner.*

B. SNYDER, *Assistant Examiner.*